Figure 1:
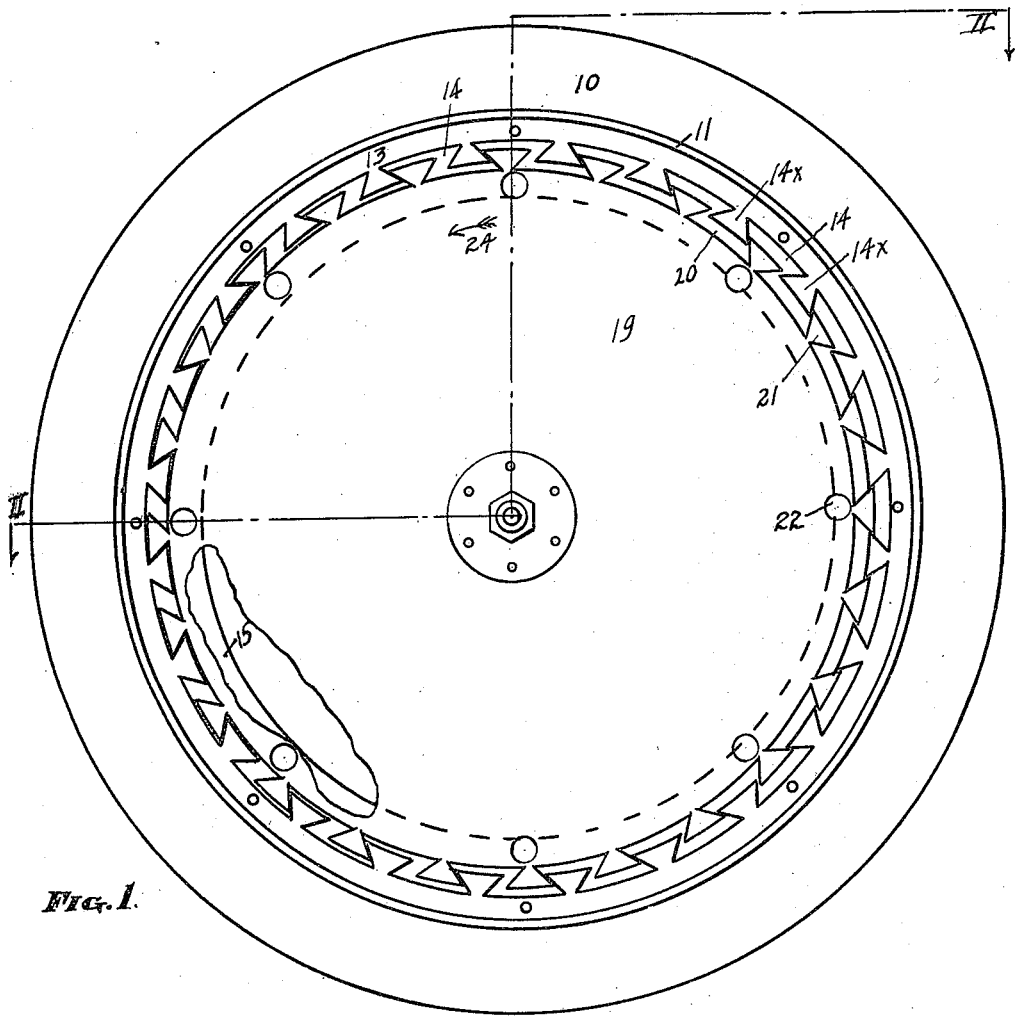

B. L. BEEBE.
APPLICATION OF POWER.
APPLICATION FILED JAN. 3, 1922.

1,429,122.

Patented Sept. 12, 1922.
2 SHEETS—SHEET 1.

INVENTOR.
Byron L. Beebe

BY U. G. Charles
ATTORNEY.

B. L. BEEBE.
APPLICATION OF POWER.
APPLICATION FILED JAN. 3, 1922.

1,429,122.

Patented Sept. 12, 1922.
2 SHEETS—SHEET 2.

INVENTOR.
Byron L. Beebe
BY
U. G. Charles ATTORNEY.

Patented Sept. 12, 1922.

1,429,122

UNITED STATES PATENT OFFICE.

BYRON L. BEEBE, OF WELLINGTON, KANSAS.

APPLICATION OF POWER.

Application filed January 3, 1922. Serial No. 526,823.

*To all whom it may concern:*

Be it known that I, BYRON L. BEEBE, a citizen of the United States, residing at Wellington, in the county of Sumner and State of Kansas, have invented certain new and useful Improvements in the Application of Power, of which the following is a description, referring to the drawings which accompany this specification.

The invention relates, first; to a driving wheel of the type employed as the rear wheel of automobiles and trucks and in which a driving element rigid with the drive shaft is adapted to engage eccentrically rim elements on the wheel so that the axis of the drive shaft is moved to one side of the center axis of the wheel rim elements, thereby throwing the load forward or backward, depending upon the direction of revolution of the drive shaft. And second; to a corresponding application of power upon a driven wheel such as the front wheels of an automobile which are simply pushed forward in contra-distinction to the rear driving wheels which moved forward under a rotary driving arrangement. The invention refers especially to an improvement upon the mechanism covered by the United States Patent #1,348,202 issued to me under date of Aug. 3, 1920, the construction of the present invention being regarded as more simple and the action of the elements in combination as more positive and effective.

Figure 2:
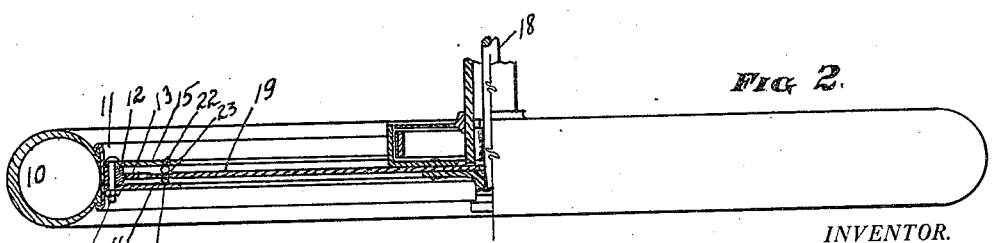
Figure 3:
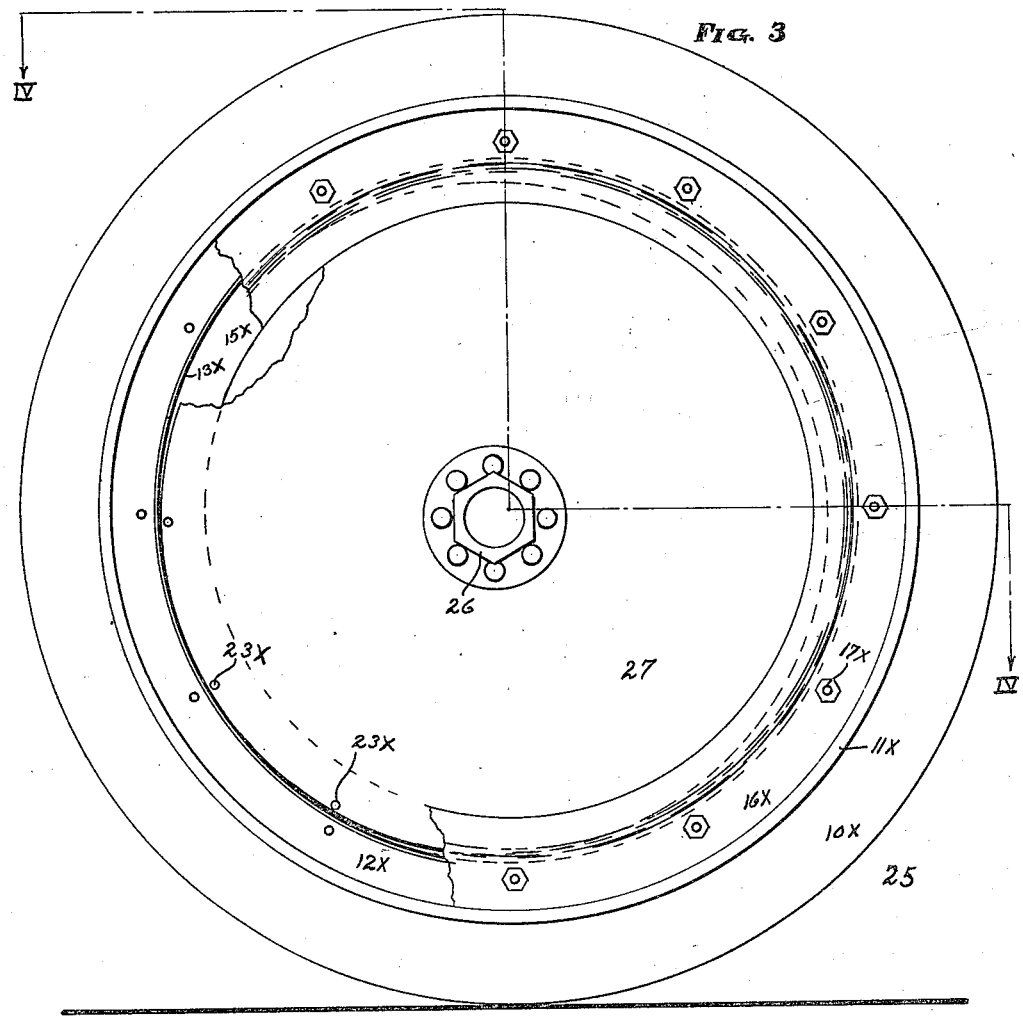
Figure 4:
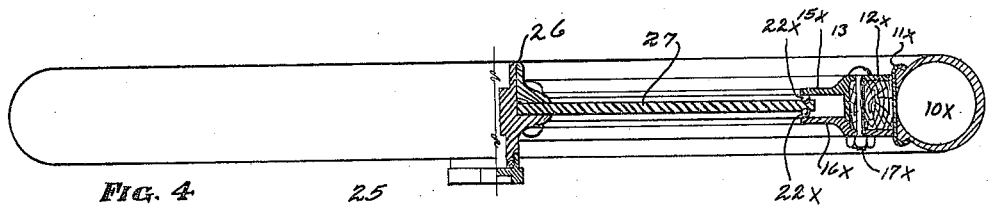

In the drawings Fig. 1 shows a side view of an automobile wheel, embodying the principles of my invention, with parts removed for clearness of illustration. Fig. 2 is a top view of Fig. 1 with a portion in section corresponding to the sectional cut taken along the line II—II, Fig. 1 looking in the direction of the arrows. Fig. 3 shows a side view of a front or driven wheel of an automobile, with parts removed for clearness of illustration. Fig. 4 is a top view of Fig. 3 with a portion in section corresponding to the sectional cut taken along the line IV—IV Fig 3 looking in the direction of the arrows. Similar numerals of reference indicate corresponding parts throughout the drawings.

Referring to the drawings, 10 is a tire casing mounted on a rim 11 rigid with the felloe 12. A ring 13 is inwardly arranged upon the felloe 12 and is provided with a series of dovetail recessed openings 14 the base of the recess being wider than the base of the dovetail rib 14$^x$ forming the sides of the adjacent recesses. A pair of outer ring elements 15 and 16 are also rigid with the felloe 12, by means of bolts 17 or so that the ring 13 is arranged intermediate the rings 15 and 16.

Power for forward or reverse rotation of the tire casing 10 in its travel upon the roadway is provided by means of the engine driven drive shaft 18 of the car. And 19 represents a circular plate rigid with the shaft 18 and having a common center. The periphery of the plate 19 is formed as a series of alternating dovetail recesses 20 and ribs 21, the base of the recesses being wider than the base of the ribs. The diameter of the plate 19 is greater than the diameter of the circle of the base of the ribs 14$^x$ on the ring 13 but less than that of the circle of the base of the recesses 14 thereof, and in the assembly illustrated, a dovetail rib 21 of the plate 19 engages with a dovetail recess 14 of the ring 13, said ring 13 and plate 19 lying in a common plane at right angles to the drive shaft 18.

A series of balls 22, each seated within an indenture 23 in the plate 19, are arranged on opposite sides thereof, or so as to bear against the outer ring elements 15 and 16 and preserve the relative positions of the ring 13 and plate 19 as to their common plane of position.

When the drive shaft rotates the plate 19 in the direction indicated by the arrow 24, the angle of the dovetail elements occasions a travel of the ribs 21 at the left of Fig. 1 to a more complete engagement with the ribs 14$^x$, that is the center of the shaft 18 has moved to the left of the center axis of the casing 10, thus the weight of the carload is eccentrically thrown upon the ribs 14$^x$ at the left of Fig. 1. Should the shaft 18 be thrown into reverse, the ribs 21 at the right of Fig. 1 would tend to slide down further and engage fully the ribs 14$^x$, reversing the position of the elements as illustrated in Fig. 1 and occasioning the application of power in a rearward direction.

The foregoing description refers to the application of power to the rear or driving wheel of an automobile, in this case the power was applied in a rotary direction; in the case of the front wheel 25 Figs. 3 and 4, the rotary action of the drive shaft 18 occasioning the previously described travel of the driven automobile thereby moves the spindle, carrying the front wheel hub 26 in a forward or backward direction. Rigid with the hub 26 is a circular plate 27 similar to the plate 19 but unprovided with dovetail elements on its periphery. The wheel 25 has a tire casing $10^x$ mounted upon a rim $11^x$ rigid with the felloe $12^x$. No ring similar to 13 on the rear assembly is employed but paired outer ring elements $15^x$, $16^x$ are shown rigid with the felloe $12^x$, the bolts $17^x$ maintaining the assembly. A series of balls $22^x$ each seated within an indenture $23^x$ in the plate 27, are arranged on opposite sides thereof, or so as to bear against the outer ring elements $15^x$, $16^x$ and preserve the relative positions of the plate 27 and the flat ring elements $13^x$ rigid on the felloe $12^x$.

It will now be understood that the plate 27 (smaller in diameter than the ring $13^x$) on being pushed forward (or back) by the moving automobile spindle (not shown) will tend to roll up on the side of the ring $13^x$ as seen in Fig. 3 and the action will become the same on the driven front wheels as on the driving rear wheels; the dovetail elements are here omitted as unnecessary. Modifications may be used within the scope of the appended claims.

Having now fully described my invention what I now claim as new and desire to secure by Letters Patent is:

1. In combination, a wheel having a central element rigid with a circular plate; and a rim carrying a ring arranged within a felloe and around the periphery of said plate.

2. In combination, a wheel having a central element rigid with a circular plate; a rim on a felloe, a ring arranged within the felloe and around the periphery of the plate; a pair of ring elements rigid with the felloe arranged on opposite sides of the first mentioned ring, and balls carried in indentures on the outer face elements of the circular plate and in contacting relationship with said paired ring elements for the purposes specified.

3. In combination, a revolvable drive shaft and a circular plate rigid therewith, dovetail recesses and ribs in alternating arrangement upon its periphery; and a rim carrying a ring having dovetail recesses and dovetail ribs in alternating arrangement upon its inner face and engaging with the dovetail ribs and recesses of the plate; the periphery of the plate ribs being less in diameter than the circle in which lie the bases of the dovetail recesses of the ring, all for the purposes substantially as specified.

4. In combination, a revolvable drive shaft and a circular plate rigid therewith, dovetail recesses alternating with dovetail ribs arranged on its periphery; and a rim carrying a ring arranged within a felloe, and upon which felloe said rim is mountable, said ring having dovetail recesses and dovetail ribs in alternating arrangement upon its inner face and engaging with the dovetail ribs and recesses of the plate, the periphery of the plate ribs being less in diameter than the circle in which lie the bases of the dovetail recesses of the ring; and a pair of ring elements rigid with the felloe and between which said first ring element is positioned and balls carried in indentures on the outer face elements of the circular plate and in a contacting relationship with said paired ring element for the purposes specified.

BYRON L. BEEBE.

Witnesses:
  M. Y. CHARLES,
  E. SAWYER